United States Patent [19]

Micouleau

[11] Patent Number: 5,791,222

[45] Date of Patent: Aug. 11, 1998

[54] TOOL FOR CUTTING AN OPEN-PROFILE SETION, PARTICULARLY A GUTTER

[75] Inventor: Jean Pierre Micouleau, Portes, France

[73] Assignee: Dal'Alu S.A., Saint Medard D'Eyrang, France

[21] Appl. No.: 432,634

[22] Filed: May 3, 1995

[30] Foreign Application Priority Data

May 3, 1994 [FR] France .................. 94 05399

[51] Int. Cl.⁶ .............. B26D 5/16; B26D 7/02; B23D 23/00

[52] U.S. Cl. ................. 83/375; 83/452; 83/462; 83/465; 83/602; 83/646; 269/232; 269/233; 269/235

[58] Field of Search ............... 83/454, 455, 456, 83/602, 609, 628, 636, 258, 262, 277, 282, 374, 375, 452, 453, 462, 465, 638, 646; 72/129, 131, 332, 338; 269/232, 233, 235

[56] References Cited

U.S. PATENT DOCUMENTS

| | | | |
|---|---|---|---|
| 2,606,613 | 8/1952 | Junkunc et al. | 83/456 X |
| 4,041,753 | 8/1977 | Hix | 72/332 |
| 4,437,374 | 3/1984 | Borzym | 83/456 X |
| 4,579,027 | 4/1986 | Lewis | 83/636 X |
| 4,848,723 | 7/1989 | Borzym | 83/456 X |
| 4,981,060 | 1/1991 | Knudson | 83/602 X |
| 5,305,625 | 4/1994 | Heinz | 83/456 X |

*Primary Examiner*—Rinaldi I. Rada
*Assistant Examiner*—Clark F. Dexter
*Attorney, Agent, or Firm*—Dennison, Meserole, Pollack & Scheiner

[57] ABSTRACT

A tool including two flat parallel flanges (2 and 3), defining between them a space (4) which corresponds to the thickness of a cutting blade (5) and including two symmetrical slots which have profiles that are roughly identical to that of a gutter (7) so as to constitute a guiding cradle for cutting the gutter by operation of the cutting blade (5) between flanges (2 and 3). The guiding cradle is defined by slots delimited in an upper zone by a convex contour (6b) of a fixed part of the flanges, and in a lower zone by the concave contour (6a) of a movable part, so that a movable part can be articulated at one of its ends around a fixed axis of rotation (8) like a jaw (9) in the open position (0), to allow free passage of the gutter (7) and in the closed position (F) constitutes a fixed support for cutting.

6 Claims, 6 Drawing Sheets

TOOL FOR CUTTING AN OPEN-PROFILE SETION, PARTICULARLY A GUTTER

The present invention relates to a tool for cutting an open-profile section, particularly a gutter made of sheet metal.

It could relate to a gutter known as a "cornice" or even a semi-circular gutter.

It is known to obtain these products by means of shaping machines which make it possible, through the action of successive rollers, to form the sheet metal according to predefined parameters from a steel or galvanized or pre-lacquered aluminum strip roll in order to obtain the desired gutter.

It is also known to dispose a cutting tool at the outlet of the shaping machine which cuts the gutter directly into the desired length. This operation can be carried out in the shop, or at a mobile shaping station which operates mainly on site.

These cutting tools can be of any type, and are constituted by, for example, a cutoff machine mounted on a frame, or by a cutting blade operated from a hinge point by a lever.

It is understood that the latter type of tool has a great disadvantage in forming an open section, unless some precautions are taken.

Thus, a cutting tool is also known which includes two flat parallel flanges, which define between them a space which roughly corresponds to the thickness of a cutting blade, and in which two symmetrical slots are provided which have profiles that are roughly identical to that of the gutter, so as to constitute a guiding cradle for it, with a view to its cutting through the operation by any means of the cutting blade between these flanges.

While such means have made it possible to improve the cutting quality, it remains no less true that it is still far from perfect, for while the gutter is guided in the corresponding slots in the flanges, it is not actually maintained there during the cutting operation. This is due to the fact that the slots must have dimensions which are greater than those of the gutter in order to allow it to be inserted and to slide easily.

Not only does the friction which results from this sliding have the harmful effect of scratching the sheet metal, especially when it is lacquered, but furthermore, the play which exists between the profile of the gutter and the slots in the flanges does not allow the gutter to be held firmly in place during the cutting.

This has the consequence of causing superficial cracks, particularly in the case of lacquered products.

Another disadvantage resides in the fact that the cutting blades in this type of tool mentioned above attack the section to be cut at two points, since the blade descends in a globally vertical manner. This has the harmful effect of creating a chip which is formed by its two ends and which comes to an end when they meet at approximately the middle of the section, which in most cases leads to an unattractive burr that can also injure a user.

Another disadvantage is due to the fact that as the gutter is being cut to a certain length, the gutter projects beyond the outlet of the shaping machine and the cutting tool, which causes it to buckle and even to twist over on itself. This misalignment with the part of the section which remains in the machine will have the harmful effect of marking the section at the level of the last shaping roller, which also renders the finished product unattractive.

The cutting tool according to the invention makes it possible to remedy these disadvantages by having a shape corresponding to the outlet of the shaping machine.

To this end, the invention relates to a tool for cutting an open-profile section which includes two flat parallel flanges, which define between them a space which roughly corresponds to the thickness of a cutting blade and in which two symmetrical slots are provided which have profiles that are roughly identical to that of the gutter, so as to constitute a guiding cradle for it with a view to its cutting through the operation by any means of the cutting blade between these flanges, characterized in that the guiding cradle defined by the slots is delimited in its upper zone by the convex contour of a fixed part of the flanges and in its lower zone by the concave contour of a movable part of the same flanges, this movable part being articulated at one of its ends around a fixed axis of rotation like a jaw, which in the open position allows the free passage of the gutter during its cutting into lengths, and then in the closed position constitutes a support for its cutting without play.

The invention will be better understood, and other characteristics of it will become evident, with the aid of description which follows, in reference to the appended schematic drawings which illustrate an embodiment of the invention.

DETAILED DESCRIPTION OF THE INVENTION

Figure 1:
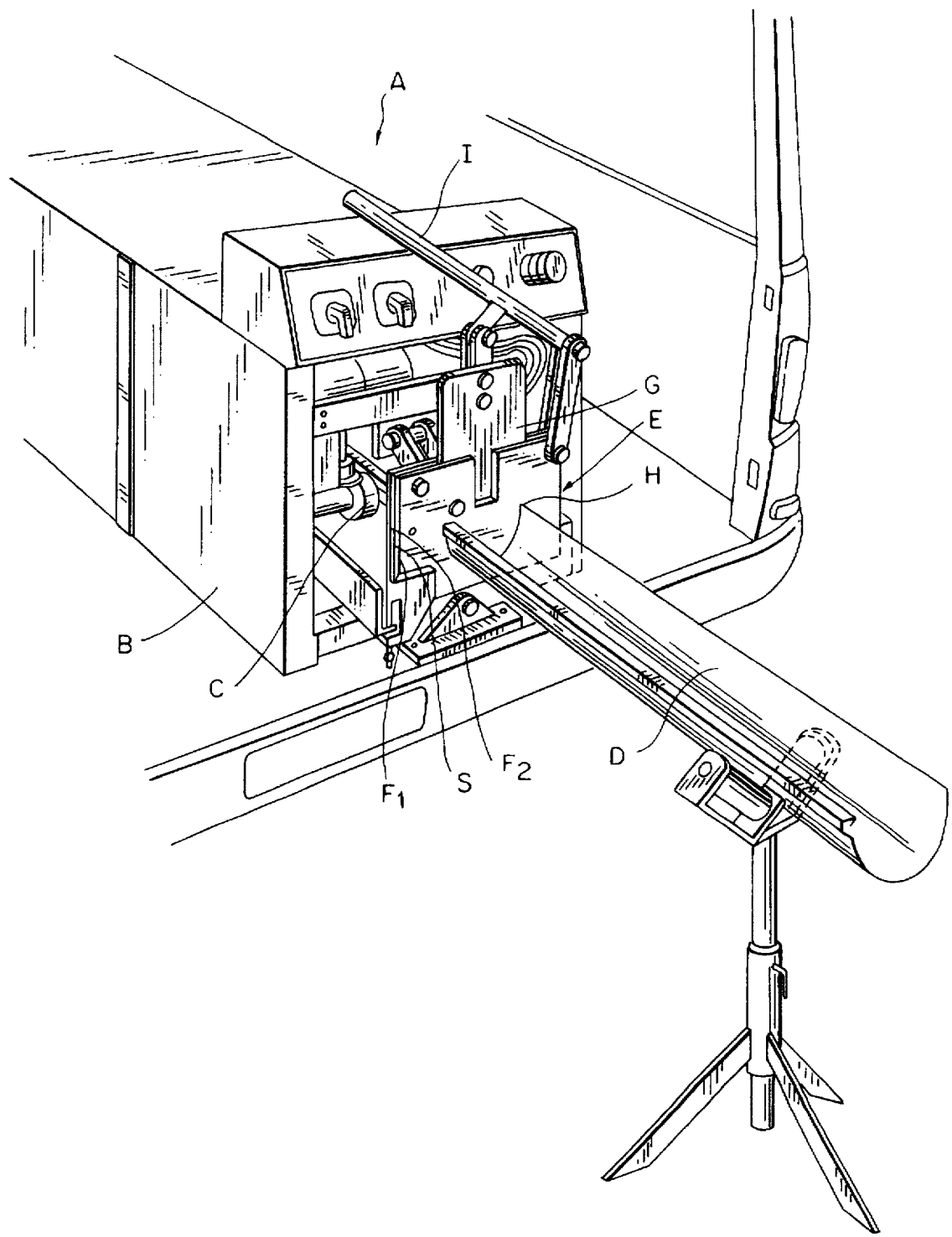
FIG. 1 is a view in perspective of a known shaping machine equipped at its outlet with a known cutting tool and a known device for supporting the gutter according to the prior art.

FIG. 1 illustrates the prior art which will be briefly summarized here so that it may be better understood how the present invention distinguishes itself.

As shown in FIG. 1, the shaping machine globally designated A includes, inside a tunnel B, a series of rollers C disposed successively according to the profile of the gutter D to be obtained at the outlet of the shaping machine A. The latter, in the present example, is installed on a vehicle in such a way as to advantageously constitute a mobile station, but of course it could also be installed in the shop.

The cutting tool E is disposed on the same frame as the shaping machine A in its zone in which the finished gutter is discharged. It is constituted by two flat, parallel flanges F1 and F2, which define between them a space S which roughly corresponds to the thickness of a cutting blade G and in which two symmetrical slots H are provided which have a profile that is roughly identical to that of the gutter D. Thus, it constitutes a guiding cradle for it with a view to its cutting through the operation of the blade G between the flanges F1, F2.

It is known to operate the blade G using a manual lever arm system I, which involves the blade in a movement from top to bottom.

As clearly stated above, such a device has the disadvantage of attacking the cutting of the gutter at two points, thus requiring greater pressure which further enlarges the spacing of the open profile, which has, moreover, a certain amount of play with the slots H in which it is seated.

The cutting tool according to the invention, designated 1 in FIGS. 2 through 9, includes two flat parallel flanges 2 and 3, which define between them a space 4 which roughly corresponds to the thickness of a cutting blade 5 and in which two symmetrical slots 6 are provided which have profiles that are roughly identical to that of the gutter 7 so as to constitute a guiding cradle for it with a view to its cutting through the operation by any means of the cutting blade 5 between these flanges 2 and 3.

The cutting tool 1 according to the invention is distinguished from the tool E of the prior art in that the guiding cradle defined by the slots 6 is delimited in its upper zone by the convex contour 6b of a fixed part of the flanges 2 and 3 and in its lower zone by the concave contour 6a of a movable part of the same flanges 2 and 3, this movable part being articulated at one of its ends around a fixed axis of rotation 8 like a jaw 9 which, in the open position O, allows free passage of the gutter 7 during its positioning for cutting into a desired length, and then in the closed position F, constitutes a support for its cutting without play. In effect, it is easily understood that such a jaw 9 is designed to press and firmly hold the gutter 7 in contact with the convex contour 6b of the fixed part of the flanges 2 and 3, since this jaw 9 is open during the forward movement of the gutter 7, thus not only assuring its free passage in the tool 1, but also preventing its being scratched through contact with the latter as in the prior art. On the other hand, the tool include means for moving the jaw 9, which is defined by the movable lower part of the flanges 2 and 3, into the open position O or the closed position F according to the relative position of the cutting blade 5 during a predetermined cutting cycle.

The means for moving the jaw 9 into the open position O or the closed position F are constituted by a rotating cam 10, which may be driven by any means, whose circumference is defined by a circular peripheral zone 10a relative to its axis of rotation XX' and by a half-flat zone 10b nearer to this same axis XX' in such a way as to cause the angular displacement of a rocker arm 11 around a fixed axis 12 disposed between one of its free ends 11a, which is in permanent contact with the cam 10 by means of a roller 13, and another end 11b linked to a part of the jaw 9 by means of a control finger 14 which is connected to the jaw 9 (i.e. the control finger 14 is connected to the movable part of the flanges 2,3) and is seated freely in a before slot 15 embodied at the other end 11b of the rocker arm 11.

The means for moving the jaw 9 are linked to complementary elements for moving the blade 5 which act simultaneously with the above, in a cycle that will be defined below.

Thus, the cutting blade 5 is operated between the flanges 2 and 3 according to a movement which is determined, on one hand, by means of a first eccentric pin 16 seated freely in a corresponding opening 17 in the blade 5 (see FIGS. 8 and 9) which is integral with a rotating circular element 18 disposed on the axis XX' of the cam 10 and integral with it in rotation, and on the other hand, by means of a second fixed pin 19 which is integral with the flanges 2 and 3 and which cooperates with a guiding slot 20 provided in the blade 5 according to a profile determined in such a way as to obtain, in combination with the movement caused by the eccentric 16, 17, 18, a simultaneous displacement of this blade 5 at a rotary speed which is zero relative to that of the gutter 7 for the obtainment of a precise cut.

Figure 6:
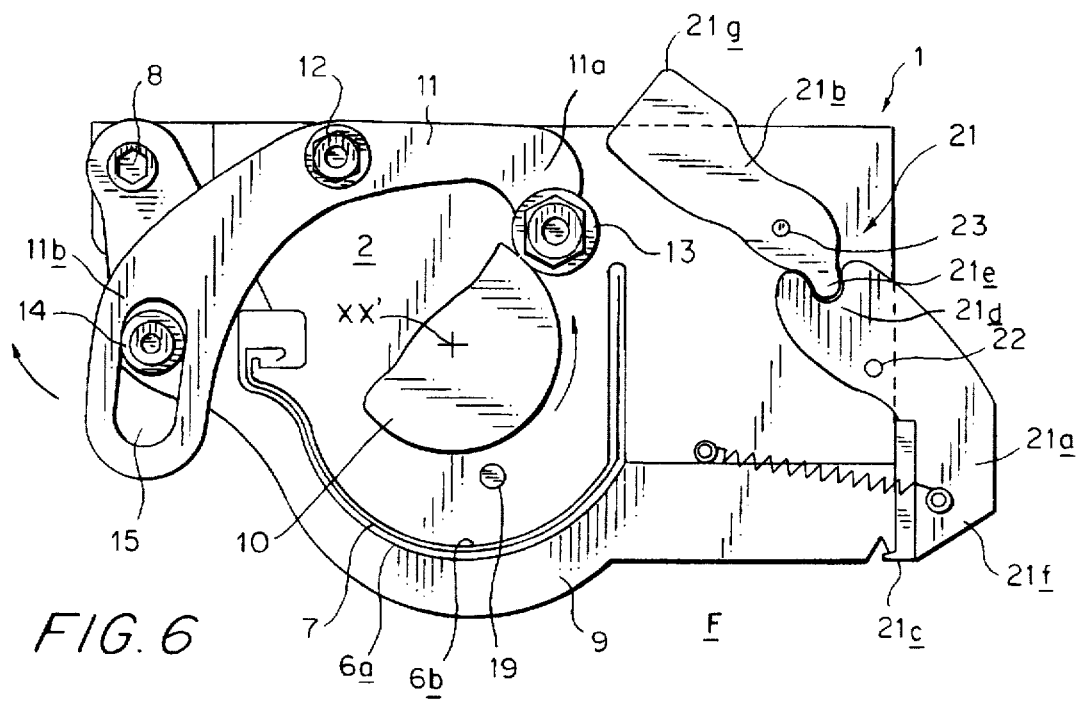
FIGS. 6 and 7 are views of the means for controlling the jaw in the closed and open positions, respectively.
Figure 7:
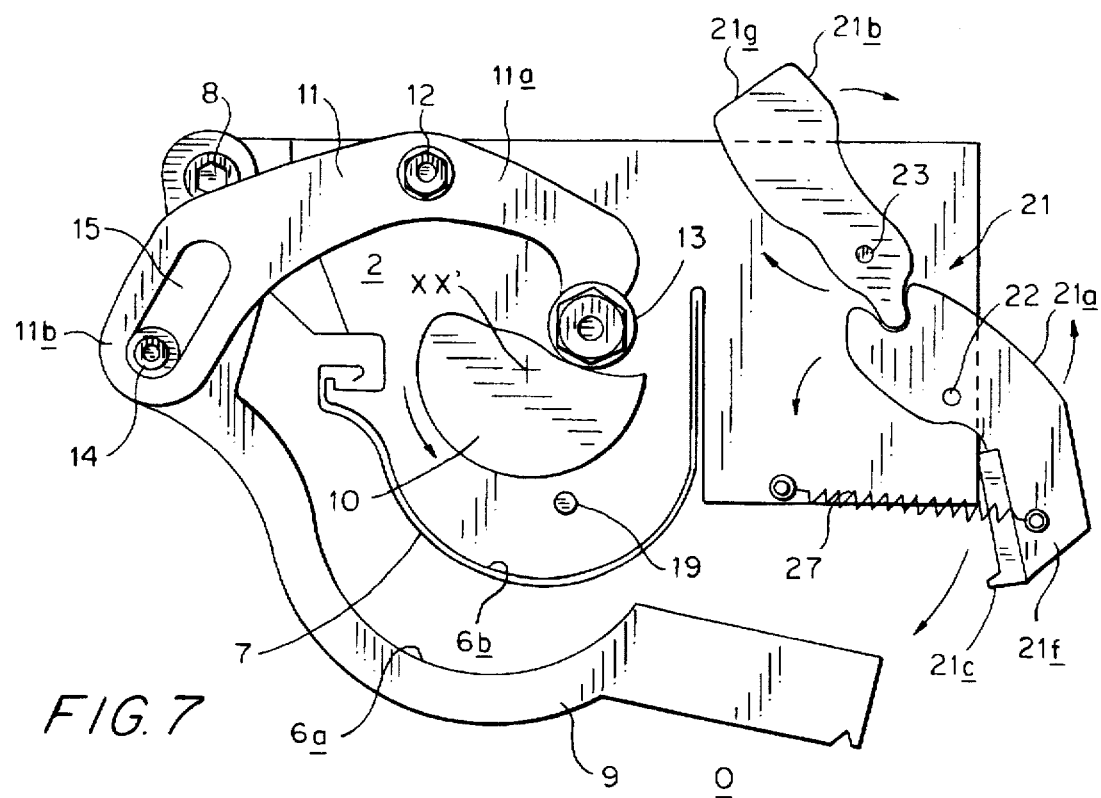
Figure 8:
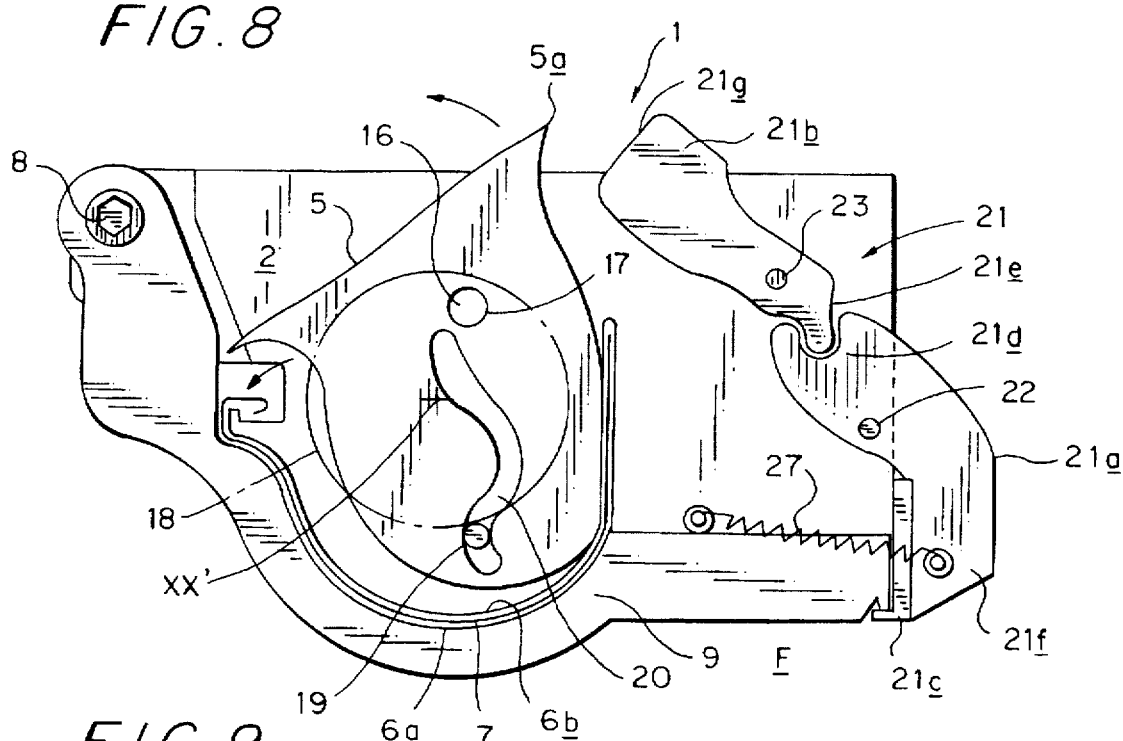
FIGS. 8 and 9 are views of the means for controlling the cutting blade during and after cutting, these figures being superposable on FIGS. 6 and 7, respectively.
Figure 9:
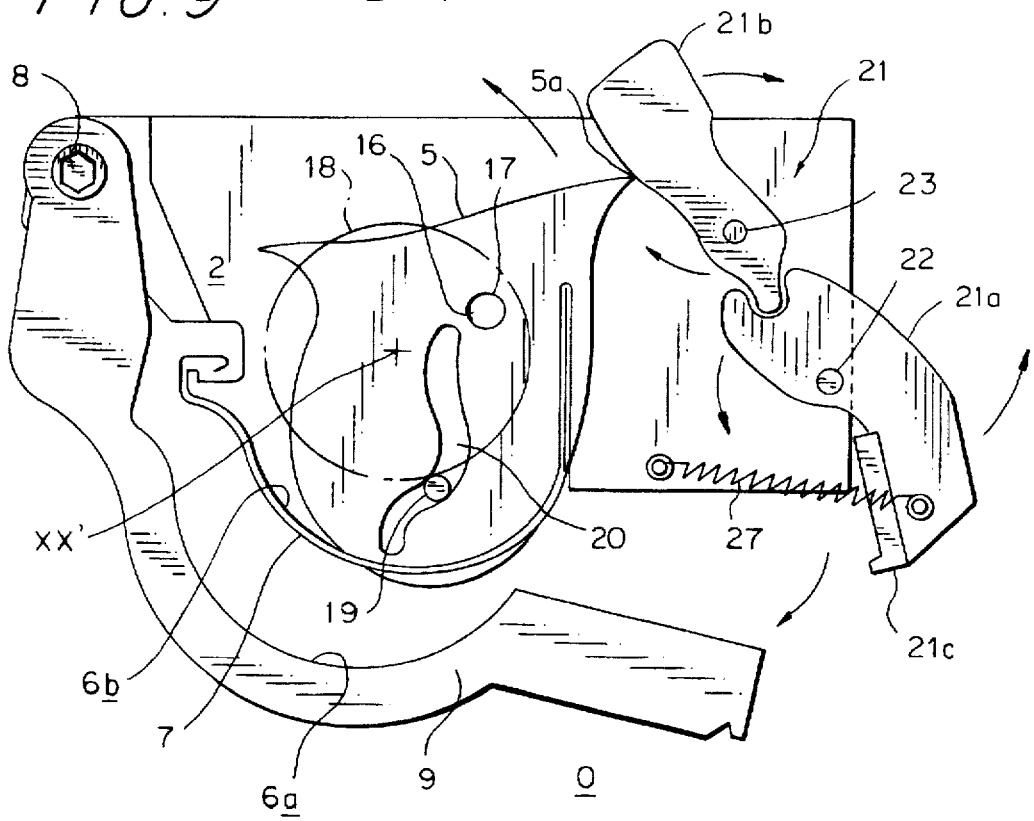

This feature is particularly well illustrated in FIGS. 8 and 9, which must be interpreted jointly with the superposable FIGS. 6 and 7, respectively.

In effect, the positions of the cam 10 which control the jaw 9, as represented in FIGS. 6 and 7, correspond to the positions of the eccentric 16, 17, 18 which controls the blade 5, as represented in FIGS. 8 and 9.

FIGS. 6, 7, 8, 9 have been simplified for a better understanding of the device.

FIGS. 8 and 9 also clearly illustrate one of the advantages achieved by the invention, which consists of obtaining a path of the blade 5 such that it attacks the cutting of the gutter 7 at a single point by progressively moving in the direction of the cut.

This makes it possible to prevent burrs by forming only one continuous chip, and also to prevent any cracking due to the firm hold on the gutter 7 during the cutting operation. Moreover, such a precise cut requires low-power means for driving the blade 5, since the pressure to be supplied is considerably reduced.

According to another characteristic of the invention, the jaw 9 which defines the lower movable part of the flanges 2 and 3 includes locking means 21 which are moved into the open position O by an extension 5a of the blade 5 which causes the locking means 21 to open at the end of the cutting cycle, the locking means 21 is automatically returned to the closed position by a return spring 27 in order to allow automatic locking of the jaw 9 at the start of the cutting cycle. As shown in FIGS. 3–9, the return spring 27 has one end attached to the locking means 21 and the other end attached to the flange 2.

More precisely, the locking means 21 of the jaw 9 are constituted by two arms 21a, 21b articulated on the respective fixed axes 22, 23 of the flanges 2 and 3 one of which pivots inside the other at their ends 21d, 21e which face one another, the other end 21g of the arm 21b being able to cooperate with the extension 5a of the blade 5 and the other end 21f of the other arm 21a including a nib 21c for anchoring the jaw 9.

Depending on the preferred choice, the means for driving the cam 10, and hence the eccentric 16, 17, 18, are constituted by a helical gear 24 which is integral with them and which is disposed on their common axis XX' to be driven in rotation by an endless screw 25 which in turn is driven by an electric motor 26.

Of course, the driving mentioned above could be obtained by any other means, for example by adapting a rotating tool such as a drill, or even by a manual rotary action.

The operation of the cutting tool which has just been described is the following, assuming that:

the relative speed of the tool 1 relative to the gutter section 7 is zero, the jaw 9 is open, the safety (not represented) of the blade 5 is engaged.

The following operations are carried out:

the release of the safety of the blade 5, the setting in rotation of the motor 26, and hence the endless screw 25, the helical gear 24, the cam 10 and the eccentric 16, 17, 18.

With a full, continuous rotation of the cam, this causes:

the return of the jaw 9 to the closed position against the gutter 7 in place (FIGS. 6, 8).

the locking of the jaw 9 by the nib 21c of the locking device 21 (FIGS. 6, 8).

the lowering movement of the blade 5 toward the immobilized gutter 7 followed by a raising movement along a path determined by the shape of the slot 20 and by the characteristics of the eccentric 16, 17, 18 which moves the blade 5.

the release of the jaw 9 at the end of the cycle through the action of the extension 5a of the blade 5 against the arm 21b of the locking device 21, thus releasing the nib 21c holding the jaw 9 (FIGS. 7, 9).

Figure 2:
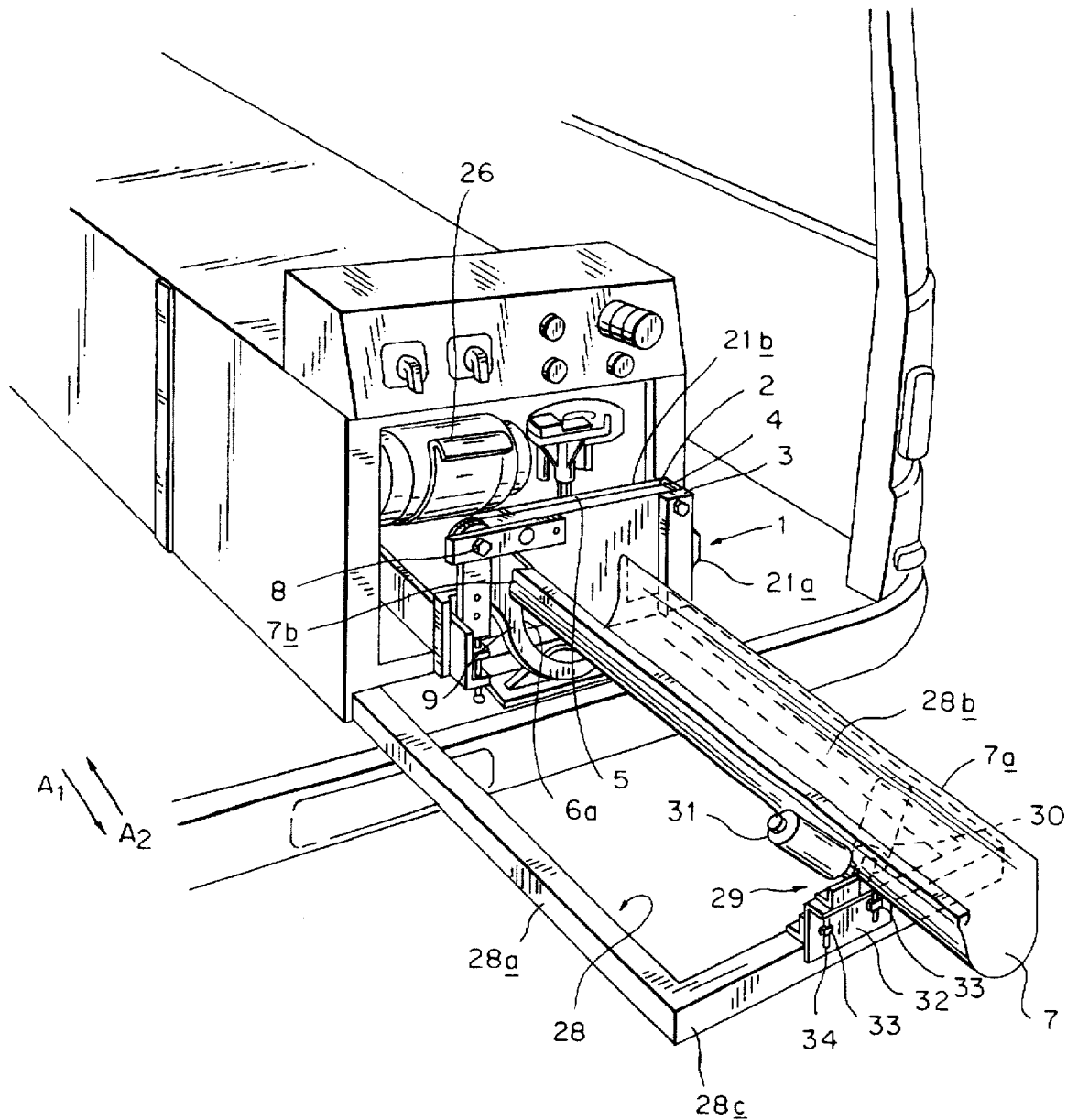
FIG. 2 is a view in perspective of a shaping machine equipped at its outlet with an alternate cutting tool including a device for supporting the gutter according to the invention.
Figure 3:
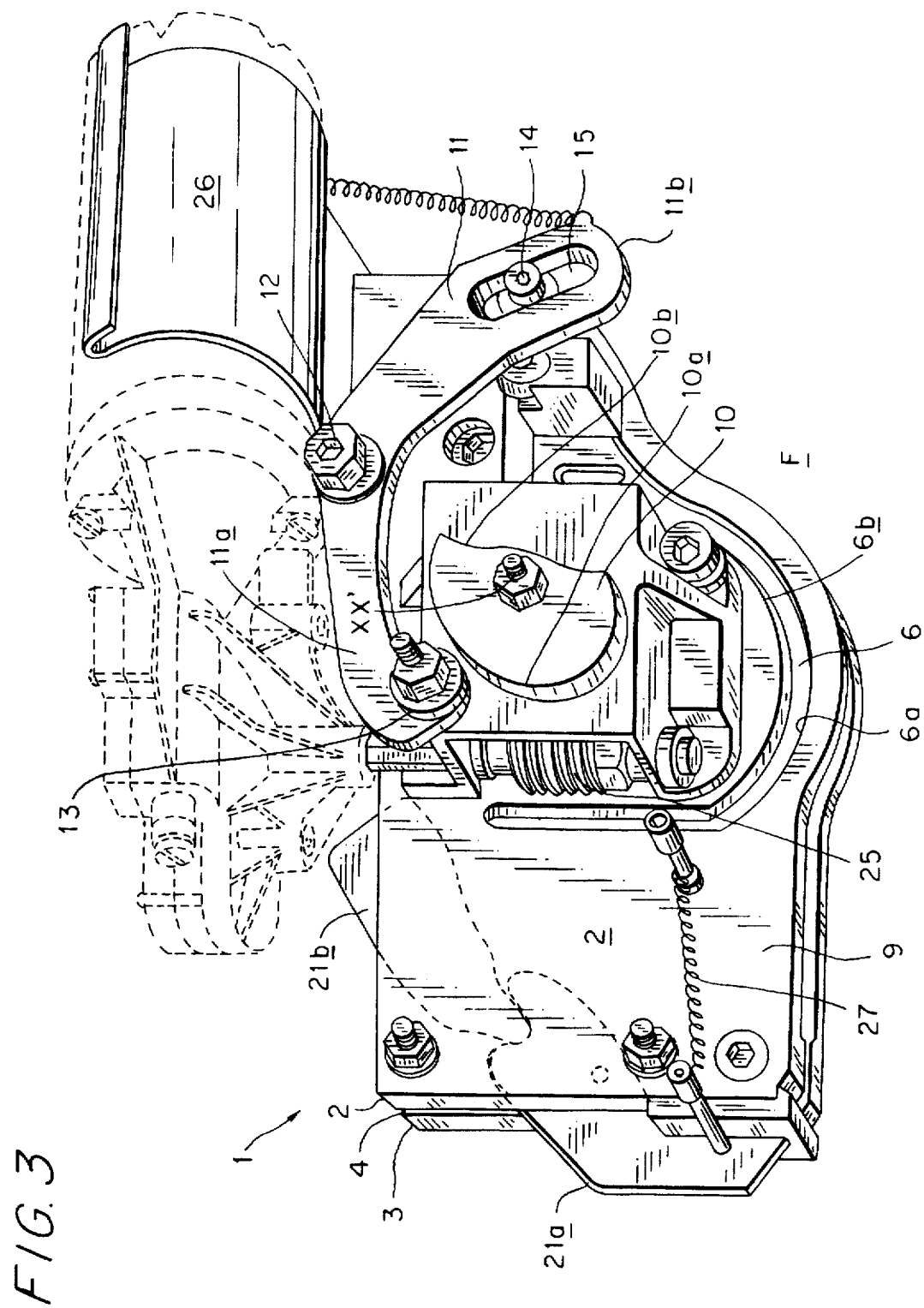
FIG. 3 is a rear view in perspective of the cutting tool according to the invention.
Figure 4:
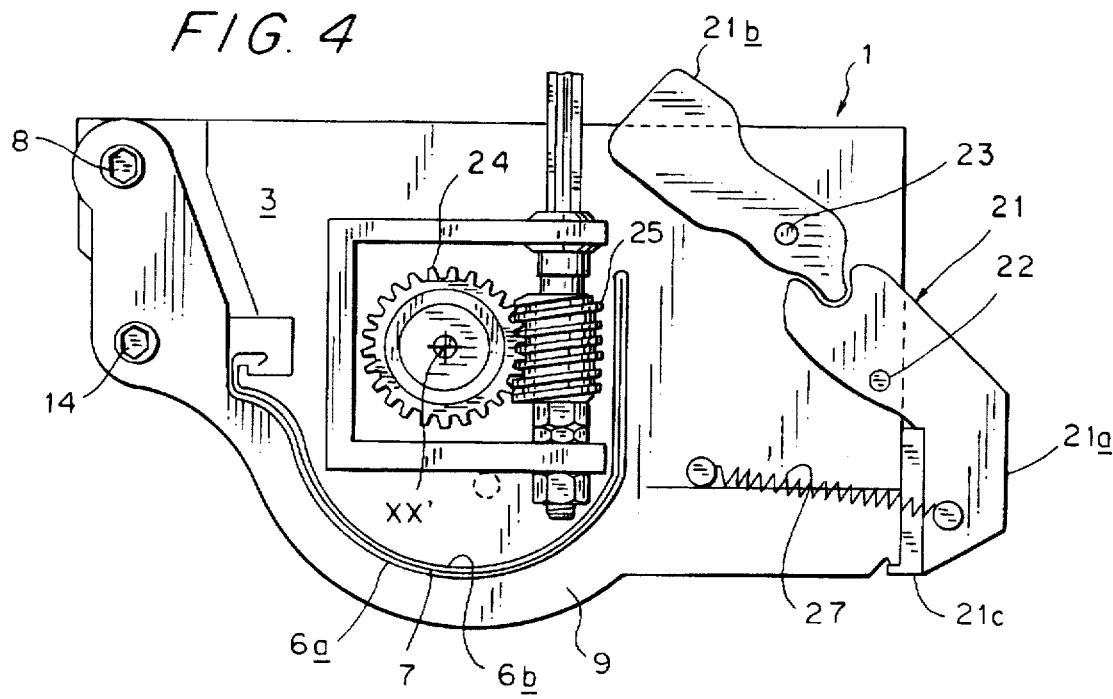
FIGS. 4 and 5 are schematic views of the cutting tool from the front and from the top, respectively, which show the system which drives the cutting blade and the jaw simultaneously.
Figure 5:
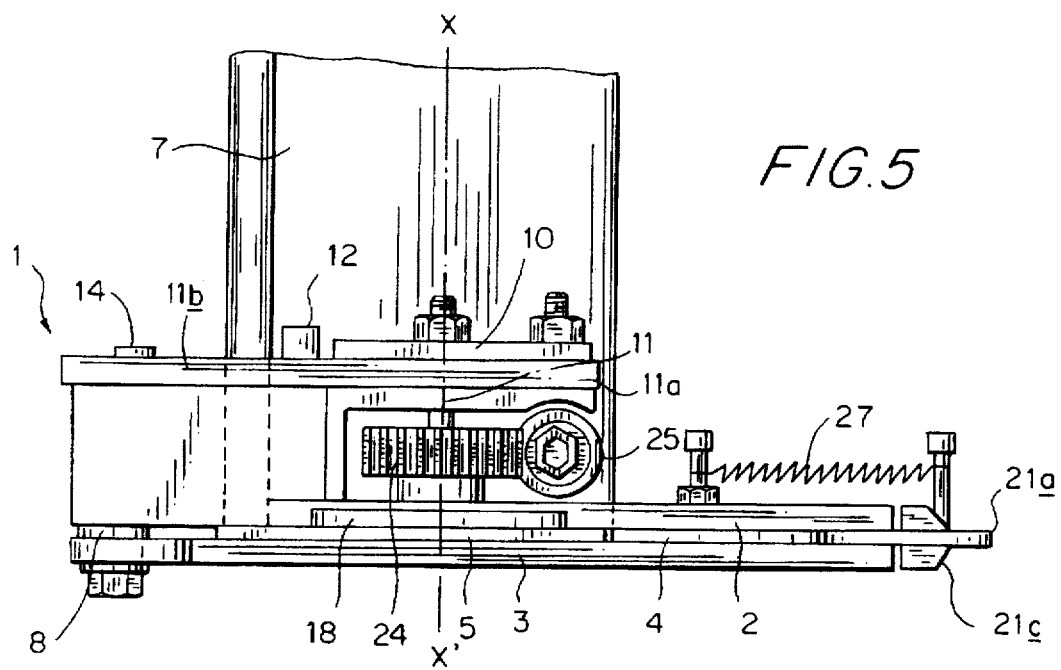

As FIG. 2 shows, the cutting tool 1 includes means which make it adaptable to the end of the shaping machine in such a way that the operation of cutting the gutter 7 into lengths constitutes the last phase of its manufacture before its being put to use.

As this figure also shows, the tool 1 is mounted on the outlet end of the shaping machine in combination with means for supporting the free part of the gutter 7 at the moment of its cutting.

According to one exemplary embodiment, the means for supporting the gutter 7 during cutting are constituted by a frame 28 which is integral with the shaping machine, thus remaining clear of the floor, disposed in a plane perpendicular to the cutting plane of the blade 5 of the tool 1, this frame 28 being adjustable according to the length of the gutter 7 to be cut and including at its end means 29 for adjusting the height of the gutter 7 so as to allow the alignment of the part to be cut 7a to be perfectly adjusted relative to the uncut part 7b.

These means are constituted by two rollers 30 and 31 disposed in a V shape for receiving the gutter 7 and fixed onto a support 32 fixed on the crossbar 28c of the frame 28 by means of screws 33 which go through the slots 34 in a novel way so as to make its height adjustable.

The frame 28 is adjustable in the plane perpendicular to that of the blade 5 by sliding its lateral members 28a, 28b in the directions A1, A2 in the corresponding longitudinal openings of the shaping machine.

I claim:

1. A tool for cutting portions of a sheet metal gutter having an open-profile cross-section, comprising:

a cutting blade having a thickness;

first and second flat flanges being arranged in parallel planes so as to define a space between them which corresponds to the cutting blade thickness, said cutting blade being slidably disposed in said space, and said flanges each having a work-receiving slot therein for receiving the open-profile cross-section of said gutter;

each of the flanges including an upper fixed portion and a lower rotatable portion, the upper fixed portions each having a convex contour in a lower zone and the lower rotatable portions each having a concave contour in an upper zone, said convex and concave contours forming at least a portion of said work-receiving slot, and a control finger connected to the lower rotatable portion of both of said flanges; a first fixed shaft rotatably supporting the lower rotatable portions, and means for moving the rotatable portions between a first, open position and a second, closed position, said lower rotatable portions forming a jaw which in said open position allows free passage of the gutter during positioning for cutting into a desired length and in said closed position constitutes a cradle for supporting the gutter without play during a cutting operation;

said means for moving the rotatable portions including a rocker arm having a control slot at a first end, a roller at a second end, a second fixed shaft supporting the rocker arm between the first and the second end, a rotatable cam having a peripheral cam surface which includes a circular peripheral zone extending around an axis of rotation of said rotatable cam and a substantially flat zone which extends nearer to the axis of rotation of said rotatable cam than said circular peripheral zone;

the control finger extending from one of said lower rotatable portions and into said control slot, said control finger being movable in the control slot of the rocker arm first end, and means for biasing said roller into contact with said circular peripheral zone and said substantially flat zone of the rotatable cam so that the substantially flat zone defines the open position and the circular peripheral zone defines the closed position of said lower rotatable portion.

2. The cutting tool according to claim 1, wherein the cutting blade is operated between the flanges by a first eccentric pin seated freely in a corresponding opening in the blade, said eccentric pin being integral with a rotating circular element disposed on an axis of said rotatable cam and integral with it in rotation, and a second fixed pin which is integral with the flanges and which is disposed in a guiding slot provided the blade and an, said guiding slot having a predetermined profile so as to obtain, in combination with the movement caused by said eccentric pin, a simultaneous displacement of said blade for the obtainment of a precise cut of said gutter.

3. The cutting tool according to claim 2, wherein said upper fixed portion of each of the flanges includes means for locking said lower rotatable portions which are moved into the open position (O) by an extension of the blade acting on said locking means so as to open at the end of a cutting cycle, and to automatically return to the closed position by a return spring in order to allow the automatic locking of said lower rotatable portion at the start of the cutting cycle, said return spring being attached at a first end on said upper fixed portion and at a second end on said locking means.

4. The cutting tool according to claim 3, wherein said means for locking includes first and second arms articulated on respective fixed shafts of the flanges, one end of the first arm being pivotally mounted inside one end of the second arm by inclusion of said one end of the first arm into said one end of the second arm, the other end of said first arm cooperating with the extension of the blade and the other end of said second arm including a nib for anchoring said lower rotatable portion.

5. The cutting tool according to claim 1, wherein said rotatable cam, said rotating circular element and a helical gear integral with said rotatable cam and said rotating circular element are mounted on a rotatable shaft, and means for driving the helical gear including an endless screw driven by an electric motor.

6. A shaping machine for producing a sheet metal gutter having an open-profile cross-section, said shaping machine comprising: a cutting tool at one end for cutting off a portion of the gutter and means for supporting the portion of the gutter to be cut off;

said cutting tool including:

a cutting blade having a thickness;

first and second flat flanges being arranged in parallel planes so as to define a space between them which corresponds to the cutting blade thickness, said cutting blade being slidably disposed in said space, and said flanges each having a work-receiving slot therein for receiving the open-profile cross-section of said gutter;

each of said flanges including an upper fixed portion and a lower rotatable portion, the upper fixed portions each having a convex contour in a lower zone and the lower rotatable portions each having a concave contour in an upper zone, said convex and concave contours forming at least a portion of said work-receiving slot, and a control finger connected to the lower rotatable portion of both of said flanges; a first fixed shaft rotatably supporting the lower rotatable portions, and means for moving the rotatable portions between a first, open position and a second, closed position, said rotatable portions forming a jaw which in said open position allows free passage of the gutter during positioning for cutting into a desired length and in said closed position constitutes a cradle for supporting the gutter without play during a cutting operation;

said means for supporting the portion of the gutter to be cut off being length and height adjustable so as to conform to the length and height of the portion of the gutter to be cut off;

the means for supporting the portion of the gutter to be cut off including a frame disposed in a plane perpendicular to the cutting plane of the blade of the cutting tool, said frame being slidable in a direction perpendicular to the cutting plane so that an end portion of the frame can be adjusted according to a length of the portion of the gutter to be cut off, and a height adjustment component for adjusting the height of the portion of the gutter to be cut off;

said means for supporting the portion of the gutter to be cut off further including first and second rollers disposed to form a V-shape, said rollers being arranged on a support which is fixed to a crossbar of the frame, the height adjustment component including slots in said support and screws which extend through said slots and into the crossbar.

* * * * *